US008763163B1

(12) United States Patent
Johns

(10) Patent No.: US 8,763,163 B1
(45) Date of Patent: Jul. 1, 2014

(54) VISOR WITH PLUG IN ACCESSORY SOCKETS

(71) Applicant: Stephen Johns, Merritt Island, FL (US)

(72) Inventor: Stephen Johns, Merritt Island, FL (US)

(73) Assignee: Foamula Products, Inc., Wellington, FL (US)

( * ) Notice: Subject to any disclaimer, the term of this patent is extended or adjusted under 35 U.S.C. 154(b) by 10 days.

(21) Appl. No.: 13/690,881

(22) Filed: Nov. 30, 2012

Related U.S. Application Data

(60) Provisional application No. 61/565,627, filed on Dec. 1, 2011.

(51) Int. Cl.
| A42B 1/18 | (2006.01) |
| A41D 27/08 | (2006.01) |
| A42B 1/00 | (2006.01) |
| A41D 27/00 | (2006.01) |

(52) U.S. Cl.
USPC .................................. 2/200.1; 2/195.1; 2/425

(58) Field of Classification Search
USPC ........ 2/209.13, 195.1, 244, 918, 171, 209.12, 2/10, DIG. 11, 175.1, 195.2, 200.1, 422, 2/909, 13, 195.7, 424, 425, 9; 40/329, 40/586, 636, 315, 618, 642.02, 661.04, 40/661.11
See application file for complete search history.

(56) References Cited

U.S. PATENT DOCUMENTS

| 1,506,815 | A | * | 9/1924 | Cormay | 2/10 |
| 1,782,206 | A | * | 11/1930 | Kornsweet | 2/12 |
| 2,160,513 | A | * | 5/1939 | Pasternak | 2/183 |
| 2,748,517 | A | * | 6/1956 | Berkis | 40/586 |
| 3,484,974 | A | * | 12/1969 | Culmone | 40/586 |
| 3,849,839 | A | * | 11/1974 | Zimber | 24/109 |
| 4,507,344 | A | * | 3/1985 | Baughman | 428/99 |
| 4,611,355 | A | * | 9/1986 | Galanto et al. | 2/246 |
| 4,776,043 | A | * | 10/1988 | Coleman | 2/209.12 |
| 4,837,960 | A | * | 6/1989 | Skaja | 40/636 |
| 4,873,726 | A | * | 10/1989 | Tapia | 2/195.1 |
| 4,918,758 | A | * | 4/1990 | Rendina | 2/171 |

(Continued)

FOREIGN PATENT DOCUMENTS

JP 2010229609 10/2010

OTHER PUBLICATIONS

Jibbitz, Create Your Story, Jibbitz Shoe Charms, Crocs., Inc., online, retrieved on Nov. 28, 2012, retrieved from http://www.crocs.comcrocs-jibbitz-compatible-crocs/jibbitz-compatible-crocs,defaults,sc . . .

(Continued)

Primary Examiner — Bobby Muromoto, Jr.
(74) Attorney, Agent, or Firm — Brian S. Steinberger; Law Offices of Brian S. Steinberger, P.A.

(57) ABSTRACT

Visor assemblies using a soft type foam visor formed from a pliable and flexible material, such as but not limited to ethylene vinyl acetate, having patterns of through-hole and partial cutouts hole that allow for accessories such as labels, charms, badges, and the like, to be plugged into the openings and easily removable and interchangeable with other accessories. The visor assemblies use a removable rear head strap having a plurality of holes with rivets that allow the strap to adjust about different head sizes. A puncture tool will turn a partial cutout into a complete throughhole cutout. The puncture tool is mountable into a cutout hole. An adapter is mountable to support sunglasses/eyeglasses.

17 Claims, 16 Drawing Sheets

(56) References Cited

U.S. PATENT DOCUMENTS

| | | | | |
|---|---|---|---|---|
| 5,003,640 A * | 4/1991 | Pizzacar | ............... | 2/209.13 |
| 5,070,545 A * | 12/1991 | Tapia | ............... | 40/329 |
| 5,136,726 A * | 8/1992 | Kellin et al. | ............... | 2/244 |
| 5,276,985 A * | 1/1994 | Halloran | ............... | 40/329 |
| 5,282,278 A * | 2/1994 | Miner | ............... | 2/195.1 |
| 5,359,734 A * | 11/1994 | Rathburn | ............... | 2/195.1 |
| 5,410,761 A * | 5/1995 | Connelly et al. | ............... | 2/195.1 |
| 5,418,981 A * | 5/1995 | Miner | ............... | 2/209.13 |
| 5,442,817 A * | 8/1995 | Miner | ............... | 2/195.1 |
| 5,452,479 A * | 9/1995 | Mostert | ............... | 2/195.1 |
| 5,477,629 A * | 12/1995 | Gleason, Jr. | ............... | 40/329 |
| 5,509,144 A * | 4/1996 | Soergel et al. | ............... | 2/195.1 |
| 5,647,060 A * | 7/1997 | Lee | ............... | 2/9 |
| 5,673,501 A | 10/1997 | Mathews | | |
| 5,734,991 A * | 4/1998 | Schmid | ............... | 2/69 |
| 5,773,118 A * | 6/1998 | Eisenpresser | ............... | 428/79 |
| 5,794,267 A * | 8/1998 | Wallace | ............... | 2/227 |
| 5,803,266 A * | 9/1998 | Blackwelder | ............... | 206/575 |
| 5,839,211 A * | 11/1998 | Pallera | ............... | 36/136 |
| 5,845,334 A * | 12/1998 | Marcolini, Jr. | ............... | 2/69 |
| 5,887,287 A * | 3/1999 | Potochnik | ............... | 2/209.13 |
| 5,901,370 A * | 5/1999 | Linday | ............... | 2/10 |
| 5,901,381 A * | 5/1999 | Nelson | ............... | 2/209.13 |
| 5,983,400 A * | 11/1999 | Kronenberger | ............... | 2/209.13 |
| 6,012,203 A * | 1/2000 | Baron Pearson | ............... | 24/114.9 |
| 6,038,702 A * | 3/2000 | Knerr | ............... | 2/244 |
| 6,044,495 A * | 4/2000 | Ellman et al. | ............... | 2/195.1 |
| 6,158,054 A * | 12/2000 | Perry, Sr. | ............... | 2/195.1 |
| 6,161,224 A * | 12/2000 | Tuetken | ............... | 2/244 |
| 6,175,963 B1 * | 1/2001 | Loeffelholz | ............... | 2/209.13 |
| 6,237,159 B1 * | 5/2001 | Martin | ............... | 2/209.12 |
| 6,279,167 B1 * | 8/2001 | Johnson et al. | ............... | 2/209.13 |
| D457,298 S * | 5/2002 | Rowland | ............... | D2/976 |
| D460,604 S | 7/2002 | Sullivan | | |
| 6,412,151 B1 * | 7/2002 | Rowland | ............... | 24/598.4 |
| 6,460,193 B1 * | 10/2002 | Di Palma | ............... | 2/171 |
| 6,513,167 B1 * | 2/2003 | Cheng | ............... | 2/171 |
| 6,519,779 B1 * | 2/2003 | Taguchi | ............... | 2/209.12 |
| 6,675,512 B1 * | 1/2004 | Shwartz et al. | ............... | 40/329 |
| 6,718,559 B1 * | 4/2004 | Davidson | ............... | 2/422 |
| 6,769,139 B1 * | 8/2004 | Goldkind | ............... | 2/247 |
| 6,802,140 B2 * | 10/2004 | Aslanides | ............... | 36/136 |
| 7,089,691 B1 * | 8/2006 | Silvera | ............... | 36/132 |
| D530,486 S * | 10/2006 | Ruttan | ............... | D2/866 |
| 7,178,364 B2 * | 2/2007 | Shapiro et al. | ............... | 63/3 |
| 7,182,478 B2 * | 2/2007 | Marston | ............... | 362/106 |
| 7,200,959 B2 * | 4/2007 | Spann | ............... | 36/136 |
| D543,014 S * | 5/2007 | Sharpe et al. | ............... | D2/884 |
| 7,243,377 B2 * | 7/2007 | Ashy | ............... | 2/209.13 |
| D558,955 S * | 1/2008 | Taylor | ............... | D2/872 |
| 7,350,274 B2 * | 4/2008 | Rogers | ............... | 24/113 MP |
| 7,389,567 B2 * | 6/2008 | Rogers et al. | ............... | 24/113 R |
| D579,606 S * | 10/2008 | Scholl et al. | ............... | D28/41 |
| D593,285 S * | 6/2009 | Olivo | ............... | D2/893 |
| D601,329 S * | 10/2009 | Johns | ............... | D2/876 |
| D606,288 S * | 12/2009 | Thorne | ............... | D2/895 |
| 7,640,636 B2 * | 1/2010 | Clark | ............... | 24/303 |
| 7,698,836 B2 * | 4/2010 | Schmelzer et al. | ............... | 36/136 |
| D618,128 S * | 6/2010 | Clark et al. | ............... | D11/3 |
| D619,336 S * | 7/2010 | Eyl | ............... | D2/866 |
| D620,235 S * | 7/2010 | Kronenberger | ............... | D2/895 |
| 7,765,618 B2 * | 8/2010 | Egglesfield | ............... | 2/244 |
| D625,052 S * | 10/2010 | Mastoras et al. | ............... | D29/122 |
| 8,001,661 B2 * | 8/2011 | Clark | ............... | 24/303 |
| 8,011,206 B2 * | 9/2011 | Imai | ............... | 63/23 |
| 8,069,538 B2 * | 12/2011 | Wilcox | ............... | 24/109 |
| D654,052 S * | 2/2012 | Lee et al. | ............... | D14/205 |
| 8,112,963 B2 * | 2/2012 | Johnson | ............... | 52/698 |
| 8,122,519 B2 * | 2/2012 | Schmelzer et al. | ............... | 2/170 |
| D672,535 S * | 12/2012 | Phan | ............... | D2/882 |
| 8,443,971 B1 * | 5/2013 | Green et al. | ............... | 206/320 |
| 8,453,267 B1 * | 6/2013 | Stanley | ............... | 2/244 |
| 8,617,683 B2 * | 12/2013 | Johnson | ............... | 428/57 |
| 8,627,516 B2 * | 1/2014 | Evans | ............... | 2/175.1 |
| 2004/0117894 A1 | 6/2004 | Kuo | | |
| 2005/0198725 A1 * | 9/2005 | Mollo | ............... | 2/422 |
| 2005/0273906 A1 * | 12/2005 | Kim | ............... | 2/195.7 |
| 2006/0007668 A1 * | 1/2006 | Chien | ............... | 362/103 |
| 2006/0152671 A1 * | 7/2006 | Risso et al. | ............... | 351/155 |
| 2007/0006502 A1 * | 1/2007 | Schmelzer et al. | ............... | 40/636 |
| 2007/0084019 A1 * | 4/2007 | Wilcox et al. | ............... | 24/3.1 |
| 2008/0060110 A1 * | 3/2008 | Schmelzer et al. | ............... | 2/69 |
| 2008/0141440 A1 | 6/2008 | Taylor | | |
| 2010/0064419 A1 | 3/2010 | Lee | | |
| 2011/0078843 A1 | 4/2011 | Kennedy | | |
| 2011/0094015 A1 * | 4/2011 | Braun et al. | ............... | 2/209.13 |
| 2012/0304691 A1 * | 12/2012 | Braun et al. | ............... | 63/5.1 |
| 2013/0318688 A1 * | 12/2013 | Cherin et al. | ............... | 2/209.13 |

OTHER PUBLICATIONS

Vizers Group, LLC, International Search Report mailed Feb. 24, 2014 for serial No. PCT/US2013/069220 filed on Nov. 8, 2013, 13 pages.

* cited by examiner

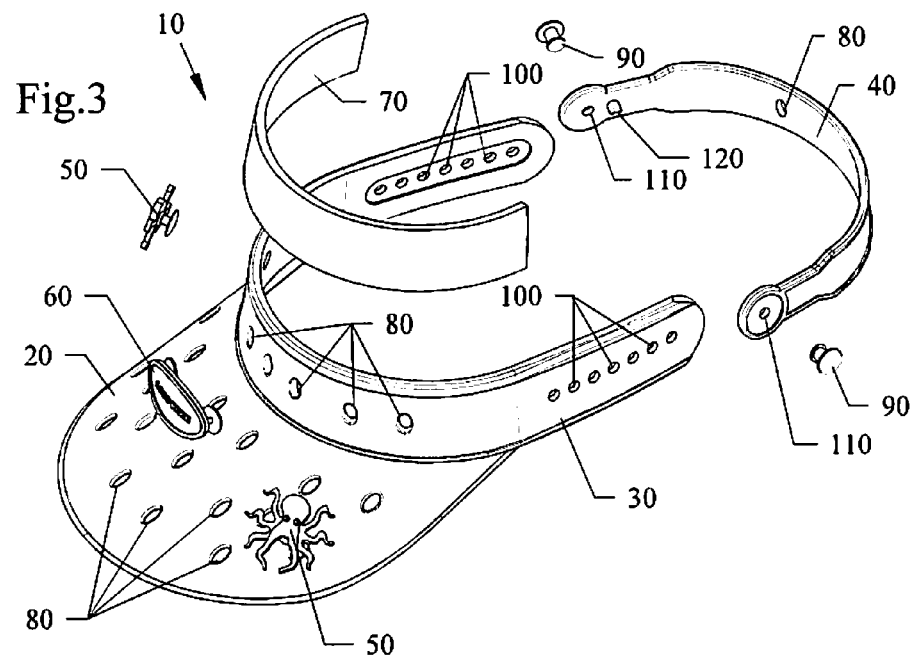
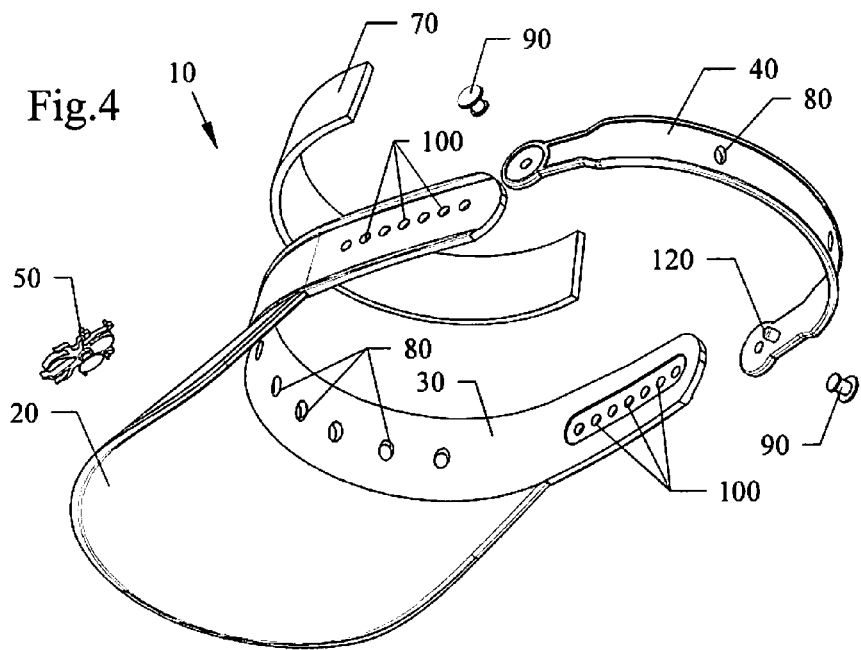

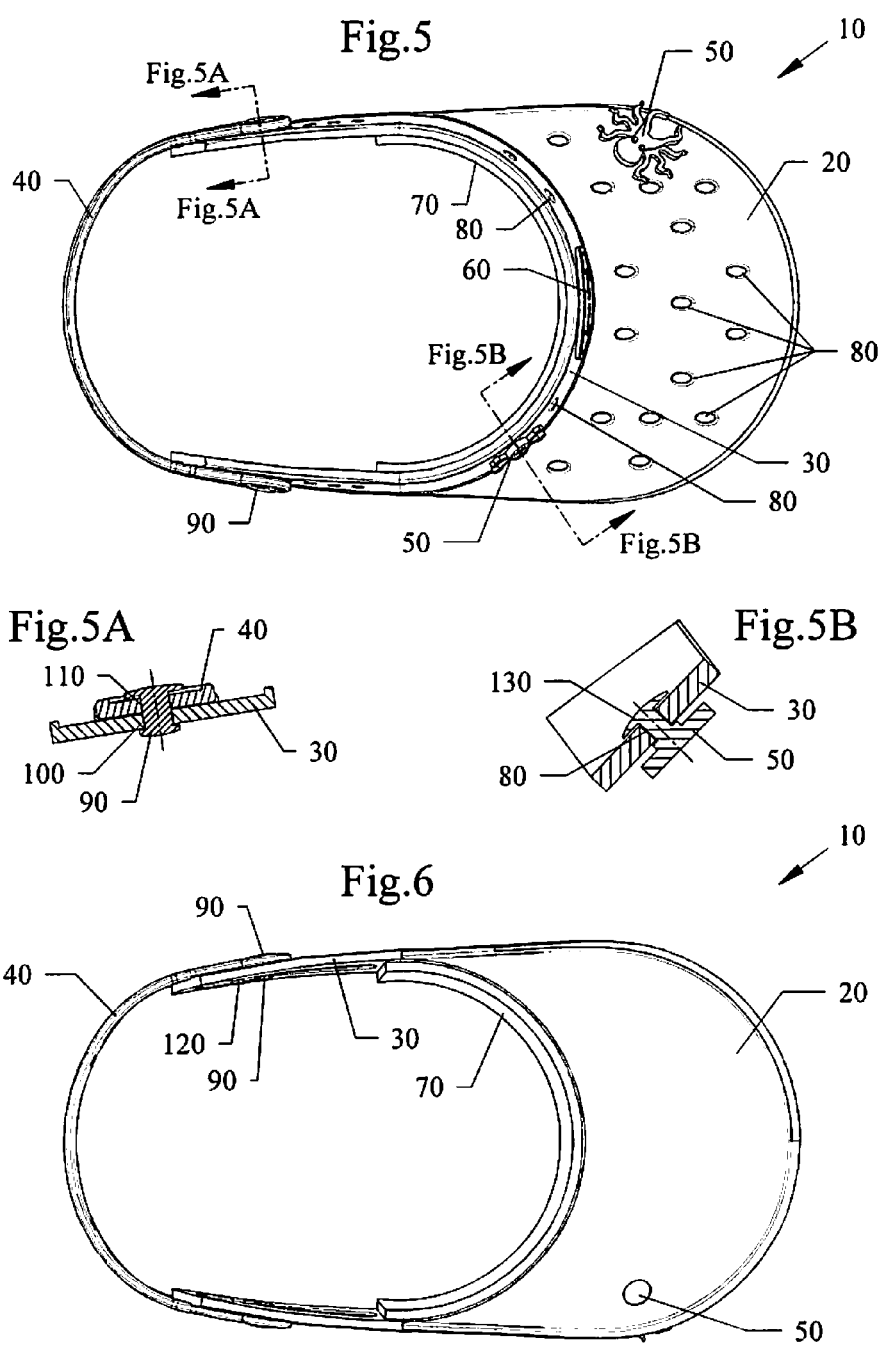

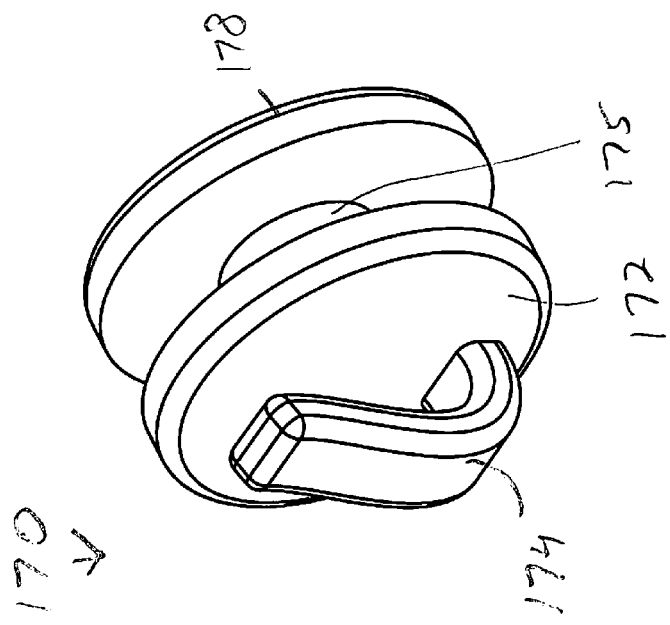
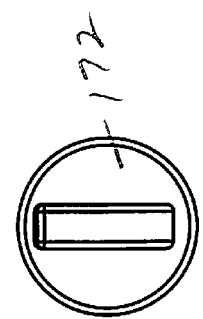
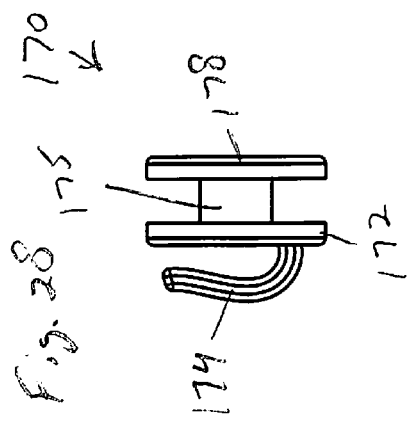

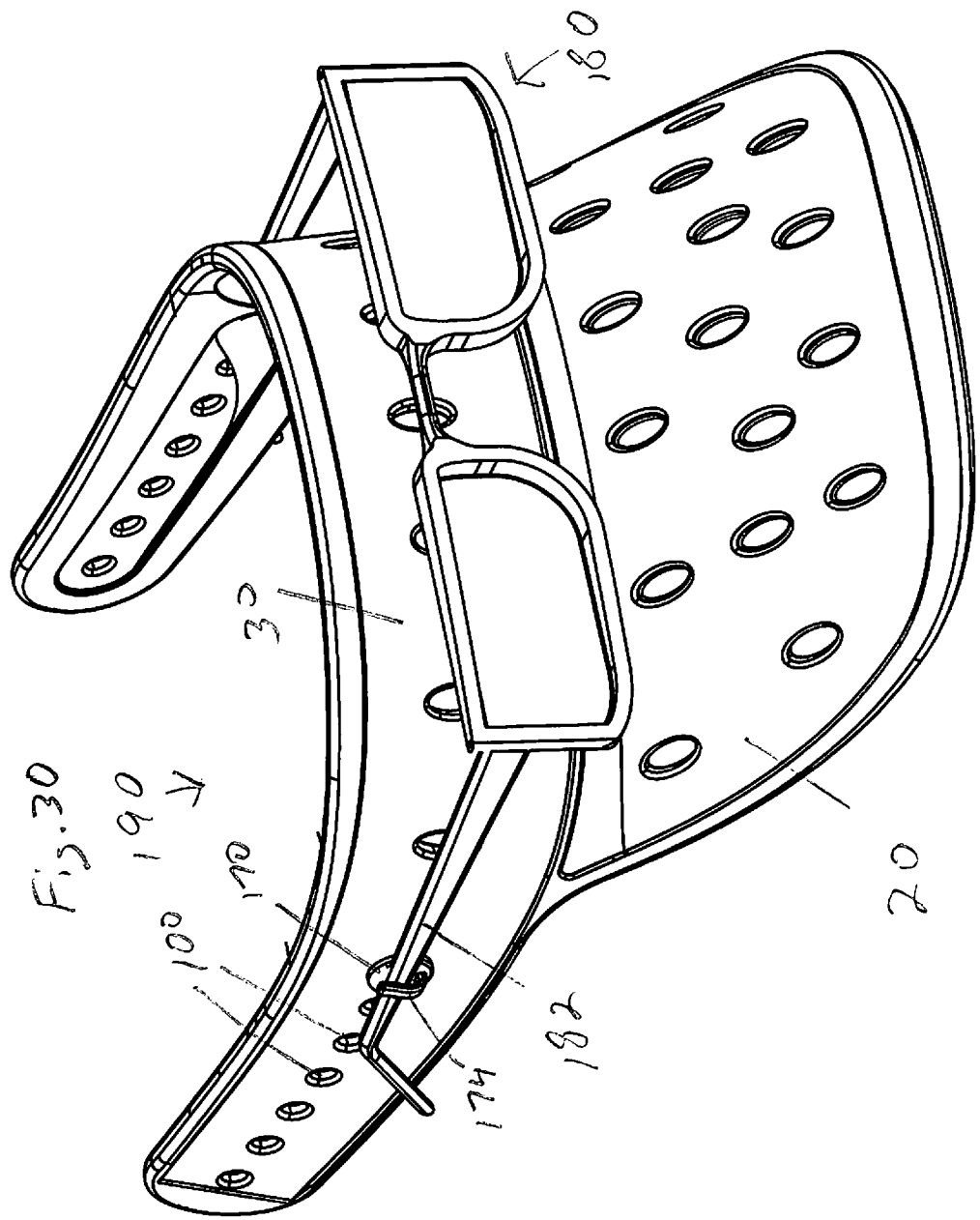

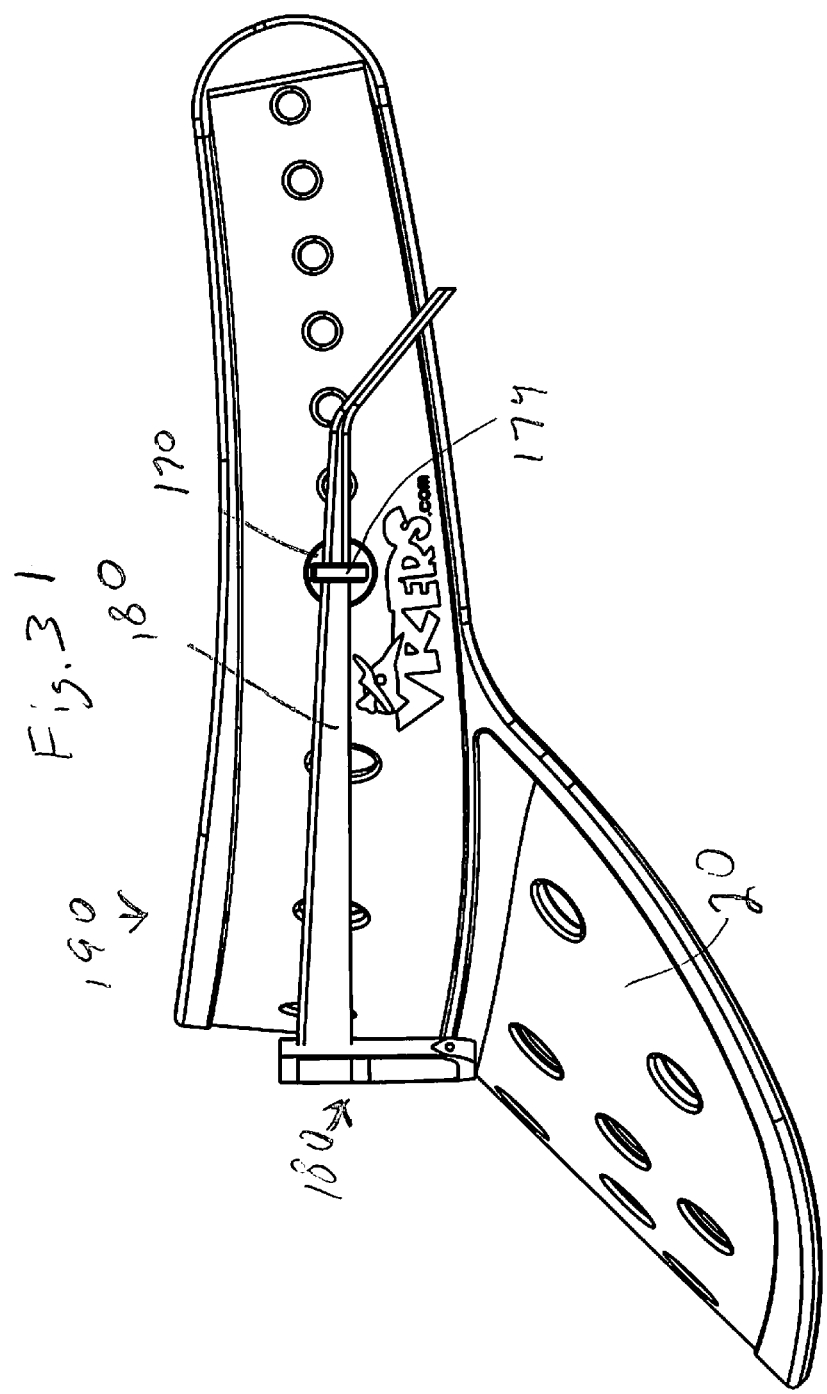

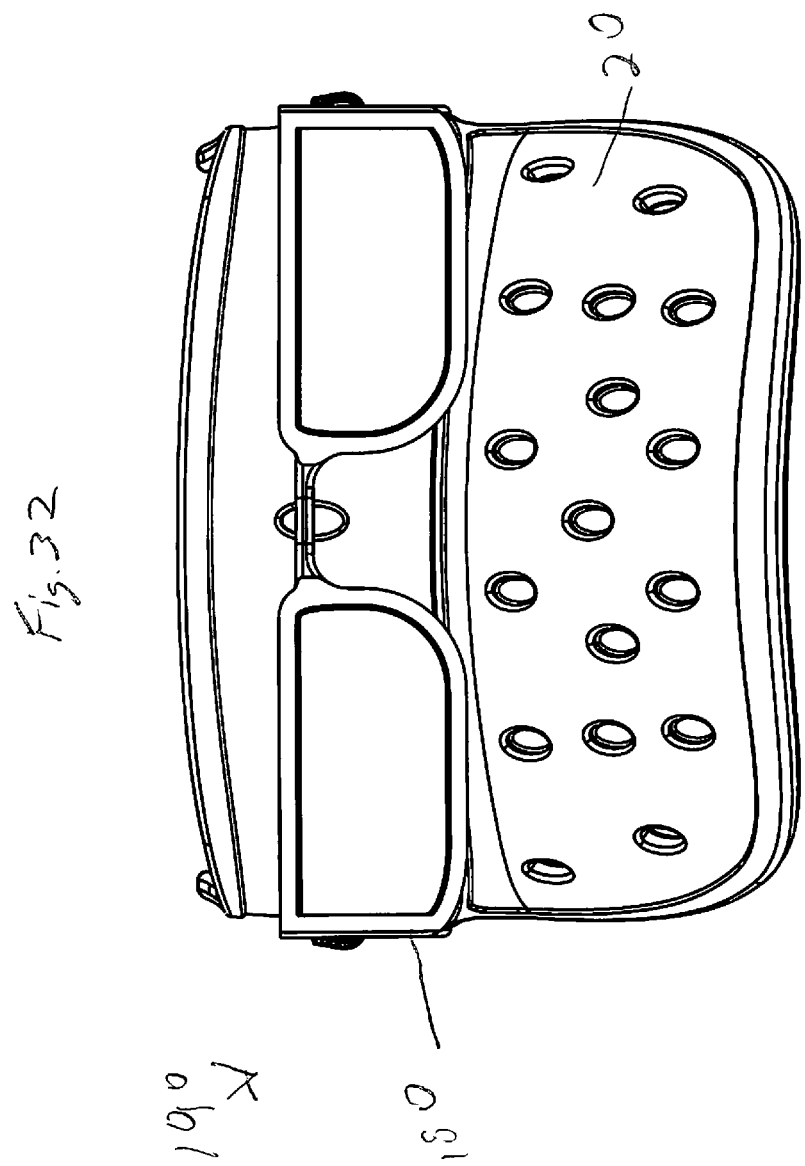

VISOR WITH PLUG IN ACCESSORY SOCKETS

This invention claims the benefit of priority to U.S. Provisional Patent Application Ser. No. 61/565,627 filed Dec. 1, 2011.

FIELD OF INVENTION

This invention relates to hats and caps, in particular to head visor assemblies, apparatus, and methods of using a soft type foam visor having patterns of different shaped hole openings, such as but not limited to geometrical shapes, letters, characters, and the like, that allow for accessories such as labels, charms, badges, sunglasses, and the like, to be plugged into the openings and easily removable and interchangeable with other accessories.

BACKGROUND AND PRIOR ART

Sun visors have become a popular type of headgear for keeping the sun off the face of the wearer. Often the visors are formed from a cloth or fabric type material with a fixed band. Other types of well known visors are formed from a hard plastic with rearwardly extending curved bands which wrap about part of the head of the wearer.

A problem with these prior art visors is that indicia (such as but not limited to advertisements, etc.) must be permanently fixed thereon. For example, sewing a label on a cloth or fabric visor is well known, but the label is not easily removable.

Painting indicia with markers and the like, can also be done on prior art visors, but the paint is also generally permanent. Peel and stick decals can also be used, but they are also intended to be permanent and are not intended to be easily removed or changed.

Using a hook and loop fastener, such as Velcro®, can also be used, but at least one side of the hook and loop fastener, must also be permanently attached to a surface of the visor.

Caps and visors have been made over the years with holes. See for example, U.S. Pat. No. 1,782,206 to Kornsweet; D460,604 to Sullivan; D601,329 to Johns, the latter being the inventor of the subject invention. However, the holes were used for ventilation and/or decoration, and were not useful for mounting and supporting indicia thereon.

Thus, the need exists for solutions to the above problems with the prior art.

SUMMARY OF THE INVENTION

A primary objective of the present invention is to provide head visor devices, apparatus, and methods of using a soft type foam visor having patterns of partial and/or full cutout hole openings that allow for accessories such as labels, charms, badges, and the like, to be plugged into the openings and easily removable and interchangeable with other accessories.

A secondary objective of the present invention is to provide head visor devices, apparatus, and methods of using a soft type foam visor having patterns of partial and/or full cutout hole openings that allow for accessories such as labels, charms, badges, and the like, to be easily removable and interchangeable with other accessories.

A third objective of the present invention is to provide head visor devices, apparatus, and methods of using a soft type foam visor having patterns of partial and/or complete throughhole openings that allow for accessories, having an adjustable head strap that is also removable.

A fourth objective of the present invention is to provide head visor devices, apparatus, and methods of using a soft type foam visor having patterns of partial and/or complete throughhole openings with a puncture tool that can turn partial cutouts into throughhole cutouts to mount accessories thereon.

A fifth objective of the present invention is to provide head visor devices, apparatus, and methods of using a soft type foam visor having patterns of partial and/or complete throughhole openings having different shapes, such as but not limited to different geometrical shapes, letter shapes, character shapes, and the like, in order to mount accessories thereon.

A sixth objective of the present invention is to provide head visor devices, apparatus, and methods of using a soft type foam visor having patterns of partial and/or complete throughhole openings that allow for accessories such as adapters to be able to mount sunglasses/eyeglasses to the visor.

A visor assembly, can include a visor with headband formed from a flexible and pliable material, a plurality of slot shapes on a front surface portion of the visor with headband, at least one accessory having a male member that mateably attaches into at least one of the slots, wherein the accessory is both attachable and detachable from the visor with headband.

The visor assembly of claim 1, can include a removable strap having ends that are attachable to left and right portions of the headband, the removable strap being formed from the flexible and pliable material. The removable strap can include rivet members having inwardly protruding portions for being insertable into a plurality of adjustment holes in the removable strap. The visor material can be EVA (ethylene vinyl acetate).

The accessory can include a logo plate, having indicia across a front surface of the logo plate, and/or a decorative charm.

The slot shapes can include circular shapes, noncircular geometrical shapes, outline shapes of different characters and objects.

The slot shapes can include through-hole cutouts through the visor, and/or partial cutouts through only a surface portion of the visor.

A puncture tool can be included for puncturing a partial-cutout into a through-hole cutout. An adapter can be used for attaching sunglasses/eyeglasses to the visor assembly.

A visor assembly kit, can include the combination of a visor with headband formed from a flexible and pliable material, a plurality of both through-hole slots and partial cut-out slots along a front surface portion of the visor with headband, a removable strap having ends that are attachable to left and right portions of the headband, the removable strap being formed from the flexible and pliable material, and a plurality of accessories, each accessory having a male member that mateably attaches into at least one of the through-hole slots and partial cut-out slots, wherein the accessories are both attachable and detachable from the visor with headband, and wherein the accessories are selected from the group consisting of logo plates and decorative charms and a puncture tool to punch out a partial cutout, and an adapter for mounting sunglasses/eyeglasses to the visor assembly. The plurality of both through-hole slots and partial cut-out slots, can include different shapes, such as different geometrical shapes, letters, character outlines.

Further objects and advantages of this invention will be apparent from the following detailed description of the pres-

BRIEF DESCRIPTION OF THE FIGURES

FIG. 3 is a top exploded perspective view of the visor assembly of FIG. 1.

FIG. 4 is a bottom exploded perspective view of the visor assembly of FIG. 3

FIG. 5 is a top view of the visor assembly of FIG. 1.

FIG. 5A is a cross-sectional view of the band rivet connection of FIG. 5 along arrow 5A.

FIG. 5B is a cross-sectional view of the charm connection of FIG. 5 along arrow 5B.

FIG. 6 is a bottom view of visor assembly of FIG. 5.

FIG. 27 is a perspective view of an adapter for mounting sunglasses/eyeglasses to the visor assembly.

FIG. 28 is a side view of the adapter of FIG. 27.

FIG. 29 is a front view of the adapter of FIG. 27.

FIG. 30 is a front perspective view of a visor assembly with adapter of FIG. 27 and mounted sunglasses/eyeglasses.

FIG. 31 is a side view of the visor assembly, adapter and mounted sunglasses of FIG. 30.

FIG. 32 is a front view of the visor assembly, adapter and mounted sunglasses of FIG. 30.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A listing of components will now be described.

| | |
|---|---|
| 10 | visor assembly. |
| 20 | Visor/brim. |
| 30 | Headband. |
| 40 | Back band. |
| 50 | Snap-in charm. |
| 60 | Snap-in logo plate. |
| 70 | Sweat band. |
| 80 | Through-hole cutouts and/or partial cut-outs for charms and logo plate. |
| 90 | Back band rivet. |
| 100 | Back band adjustment holes in headband. |
| 110 | Rivet hole in back band. |
| 120 | Back band alignment stud. |
| 130 | Studs to secure logo plate and charms into cutouts. |
| 140. | Puncture tool |
| 142. | front of tool |
| 144. | raised gripping surface |
| 145. | puncture tip |
| 147. | stem |
| 148. | stud/rear wall |
| 150. | visor assembly with different shaped cutouts |
| 152. | letter shaped cutout |
| 154. | star shaped cutout |
| 158. | half moon shaped cutout |
| 160. | visor assembly with more different shaped cutouts |
| 162. | triangle shaped cutout |
| 164. | rectangular/square shaped cutout |
| 166. | cartoon character shaped cutout |
| 170. | adapter for eyeglasses/sunglasses |
| 172. | front wall of adapter |
| 174. | curved hook |
| 175. | stem |
| 178. | stud/rear wall |
| 180. | eyeglasses/sunglasses |
| 182. | arm(s) |
| 190. | visor assembly for eyeglasses/sunglasses |

The inventor of the subject invention is also the inventor on U.S. Design Pat. D601,329 to Johns, which is incorporated by reference.

Figure 1:
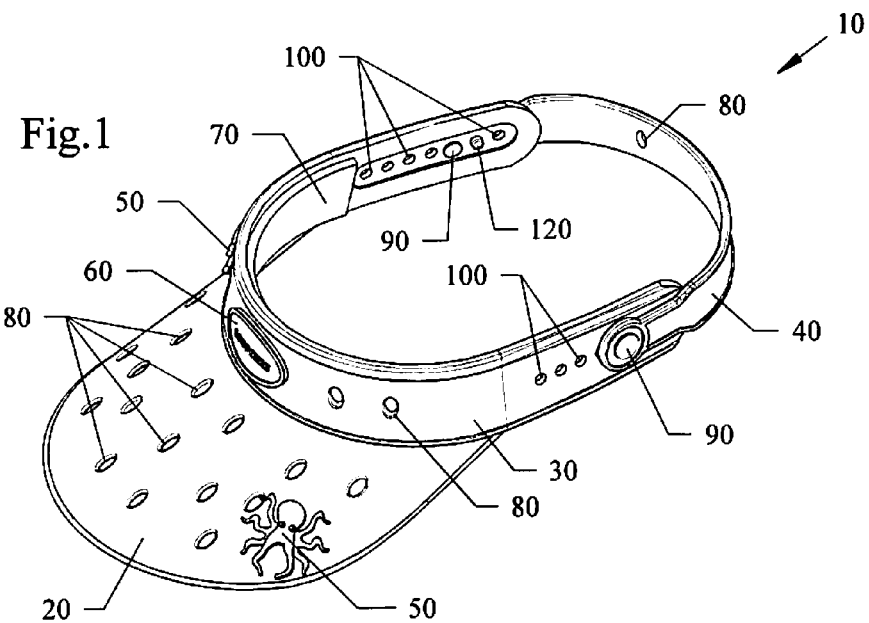
FIG. 1 is a top perspective view of the novel visor assembly.
Figure 2:
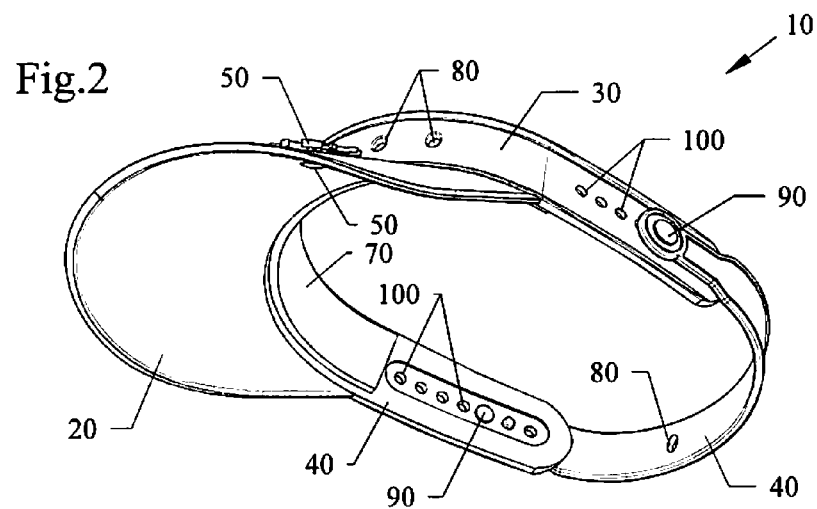
FIG. 2 is a bottom perspective of the visor assembly of FIG. 1.

FIG. 1 is a top perspective view of the novel visor assembly 10. FIG. 2 is a bottom perspective of the visor assembly 10 of FIG. 1. FIG. 3 is a top exploded perspective view of the visor assembly 10 of FIG. 1. FIG. 4 is a bottom exploded perspective view of the visor assembly 10 of FIG. 3 FIG. 5 is a top view of the visor assembly 10 of FIG. 1.

FIG. 5A is a cross-sectional view of the band rivet connection of FIG. 5 along arrow 5A.

FIG. 5B is a cross-sectional view of the charm connection of FIG. 5 along arrow 5B.

Figure 7:
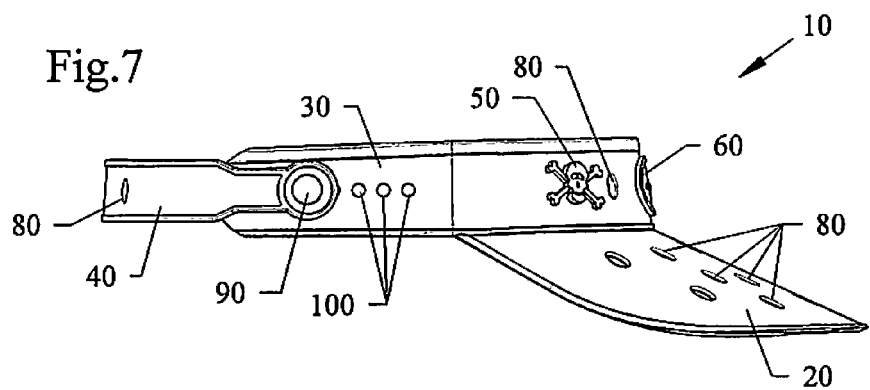
FIG. 7 is a right side view of the visor assembly of FIGS. 5-6.
Figure 8:
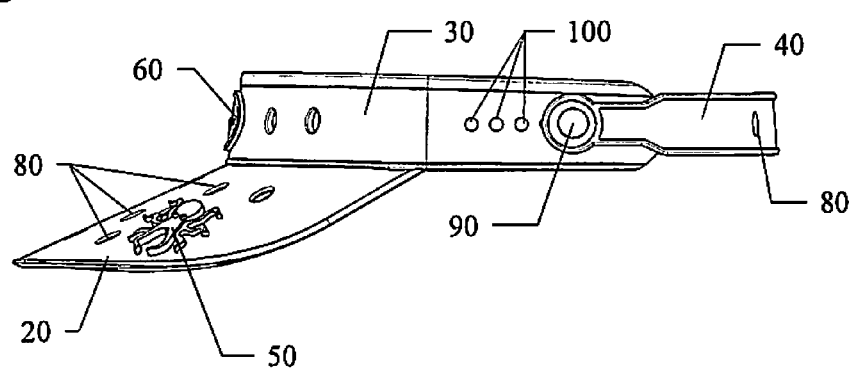
FIG. 8 is a left side view of the visor assembly of FIGS. 5-6.
Figure 9:
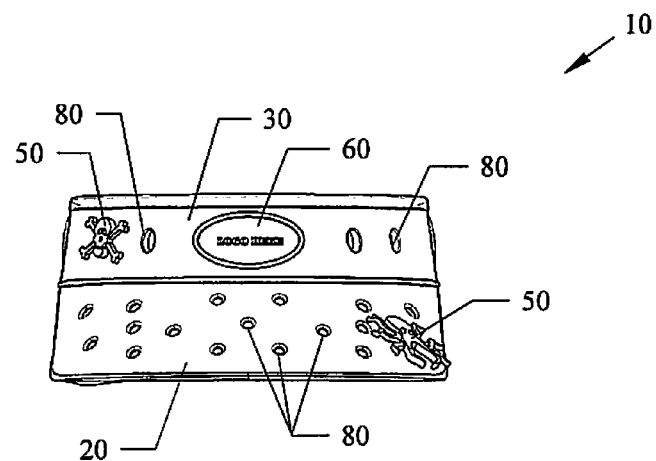
FIG. 9 is a front side view of the visor assembly of FIGS. 5-8.
Figure 10:
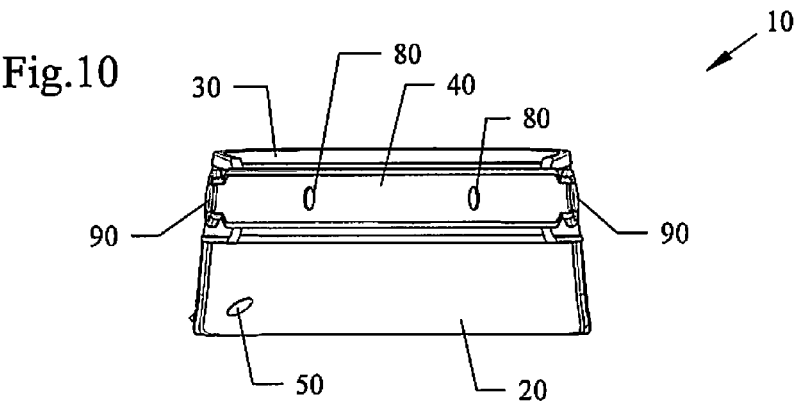
FIG. 10 is a rear side view of the visor assembly of FIGS. 5-8.

FIG. 6 is a bottom view of visor assembly 10 of FIG. 5. FIG. 7 is a right side view of the visor assembly 10 of FIGS. 5-6. FIG. 8 is a left side view of the visor assembly 10 of FIGS. 5-6. FIG. 9 is a front side view of the visor assembly 10 of FIGS. 5-8. FIG. 10 is a rear side view of the visor assembly 10 of FIGS. 5-8.

Figure 11:
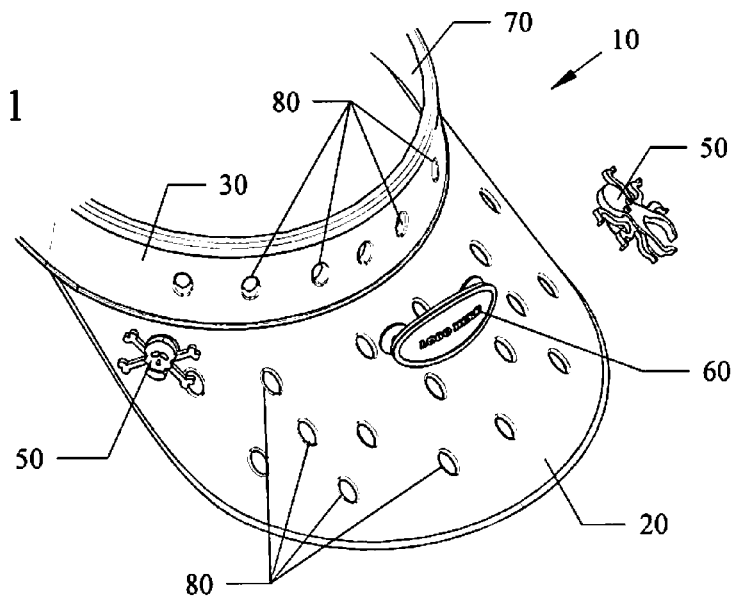
FIG. 11 is a top front perspective view of the visor assembly of the preceding figures showing logo plate and charm ready to be installed.

FIG. 11 is a top front perspective view of the visor assembly 10 of the preceding figures showing logo plate and charm ready to be installed.

Figure 12:
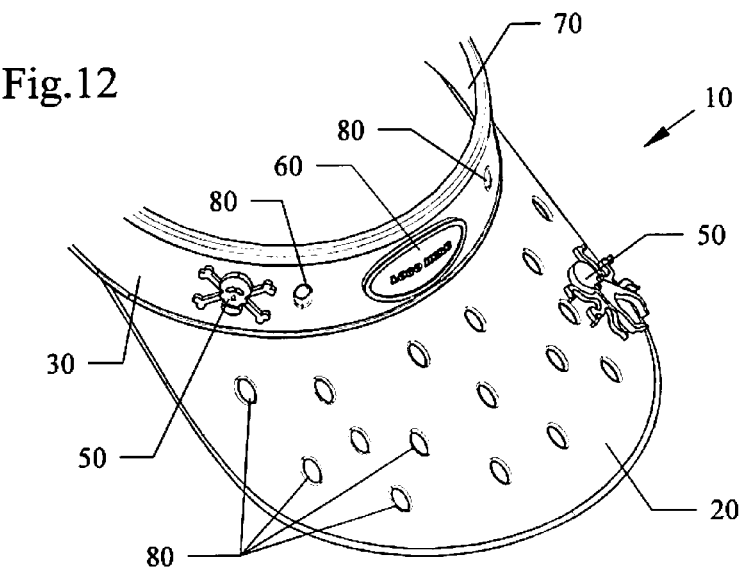
FIG. 12 is another top front perspective view of the visor assembly of FIG. 11 showing logo plate and charms installed.

FIG. 12 is another top front perspective view of the visor assembly 10 of FIG. 11 showing logo plate and charms installed.

Figure 13:
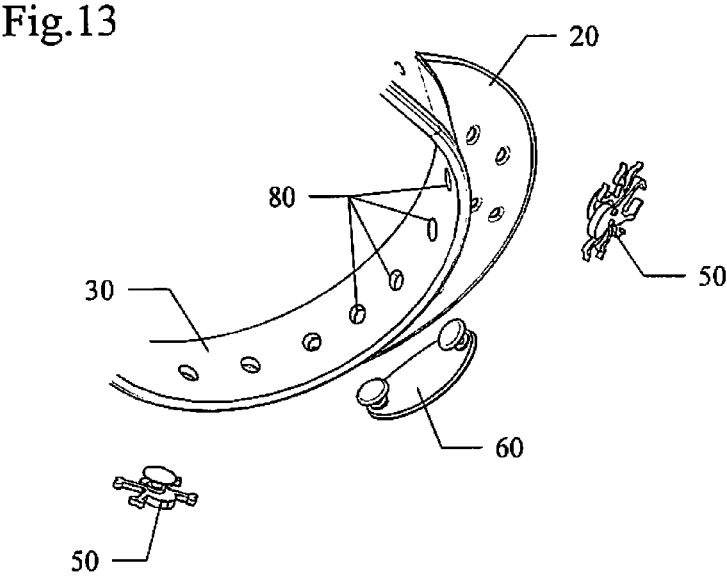
FIG. 13 is a bottom front inside perspective view of the visor assembly of FIG. 11 showing logo plate and charm ready to be installed.

FIG. 13 is a bottom front inside perspective view of the visor assembly 10 of FIG. 11 showing logo plate and charm ready to be installed.

Figure 14:
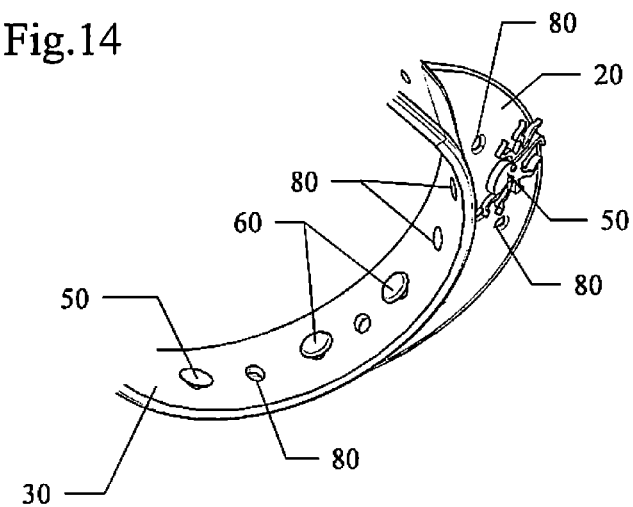
FIG. 14 is a bottom front inside perspective view of the visor assembly of FIG. 13 showing logo plate and charm installed.

FIG. 14 is a bottom front inside perspective view of the visor assembly 10 of FIG. 13 showing logo plate and charm installed.

Figure 17:
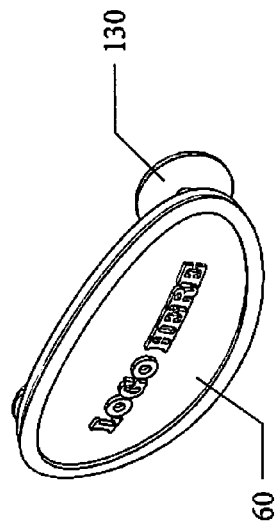
FIG. 17 is a front right perspective view of the logo plate of FIG. 15.
Figure 18:
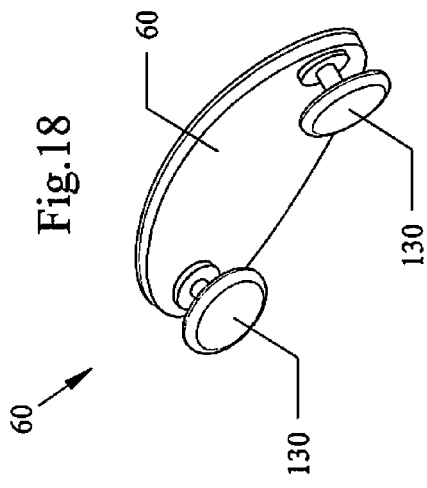
FIG. 18 is a rear right perspective view of the logo plate of FIG. 15.
Figure 15:
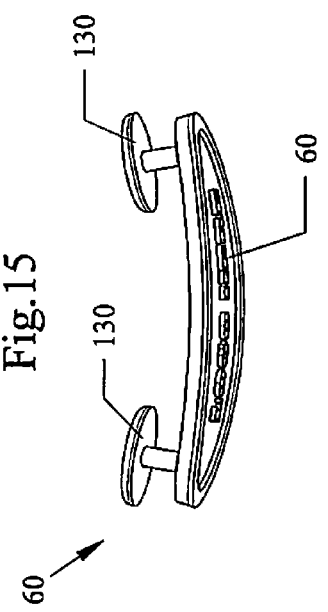
FIG. 15 is a top view of a logo plate for the visor assembly of the preceding figures.
Figure 16:
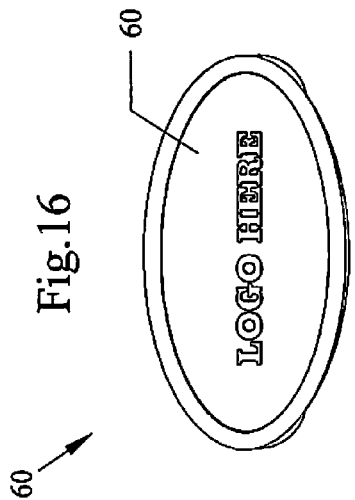
FIG. 16 is a front view of the logo plate of FIG. 15.

FIG. 15 is a top view of a logo plate for the visor assembly 10 of the preceding figures. FIG. 16 is a front view of the logo plate of FIG. 15. FIG. 17 is a front right perspective view of the logo plate of FIG. 15. FIG. 18 is a rear right perspective view of the logo plate of FIG. 15. The logo plates can have indicia on a front surface portion, such as but not limited to advertisements, sports teams, names, pictures, and the like.

Figure 19:
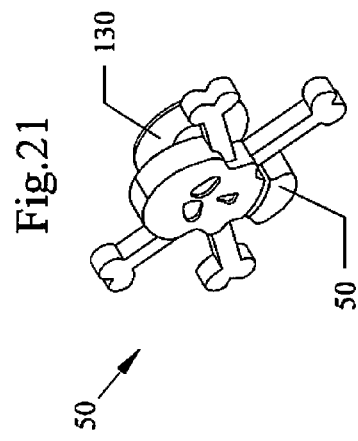
FIG. 19 is top view of a charm accessory for the visor assembly of the preceding figures.
Figure 20:
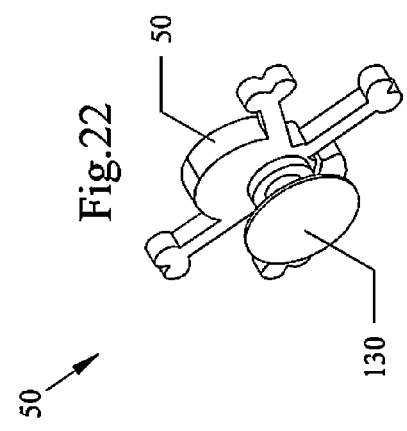
FIG. 20 is a front view of the charm of FIG. 19.
Figure 21:
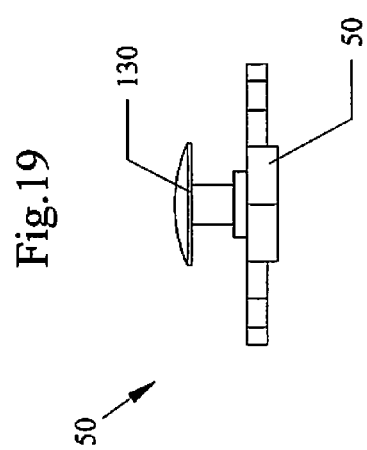
FIG. 21 is a front right perspective view of the charm of FIG. 19.
Figure 22:
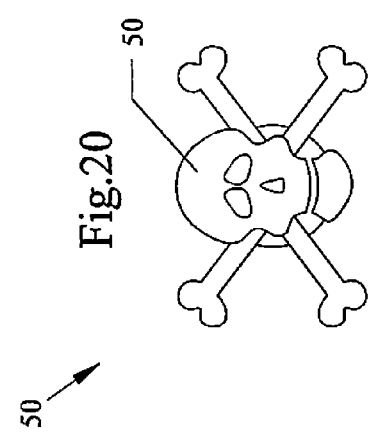
FIG. 22 is a rear right perspective view of the charm of FIG. 19.

FIG. 19 is top view of a charm accessory for the visor assembly 10 of the preceding figures. FIG. 20 is a front view of the charm of FIG. 19. FIG. 21 is a front right perspective view of the charm of FIG. 19. FIG. 22 is a rear right perspective view of the charm of FIG. 19. The charm accessory can be a decorative part, such as but not limited to a Jibitz™. The decorative pieces, can include various types of shapes, such as but not limited to animals, fish, birds, cartoon characters, flowers, trees, and the like.

Referring to FIGS. 1-22, the visor assembly can be comprised of two or three components. The main two components are the front part of the visor assembly which includes a visor portion 20 with front head band portion 30, that is separated from and attachable to a back band 40 type strap. A third component can be a sweatband 70 that can be attached into the inside wall of the head band portion 30.

The visor portion 20 with front band portion 30, and the back band (strap) 40 can be formed from or molded from a soft plastic, such as but not limited to EVA (ethylene vinyl acetate). The novel visor 10 can also be water proof, float in water, be anti-bacterial, have good clarity and gloss, barrier properties, low-temperature toughness, stress-crack resistance, hot-melt adhesive, and resistance to UV (ultra violet) radiation. EVA has little or no odor and is competitive with rubber and vinyl products in cost. The invention can be formed from other materials, similar to EVA, that also have similar properties.

The visor assembly 10 of the previous figures can have partial cutouts instead of completely through-hole cutouts 80. The partial cut-outs can have indentations through the visor/brim 20 and/or through the headband 30 that are not complete through-holes. These partial cut-outs can be molded to have narrow thicknesses than the rest of the visor/brim 20 and headband 30 material. As such, the user can use a puncture tool 140 as described in FIGS. 23-24 to complete the cut-out through the visor/brim 20 and/or headband 30 as desired. For example, a visor assembly 10 can have a mix of through-hole cutouts and partial cut-outs. Alternatively, the visor assembly can have all through-hole cutouts or all partial cut-outs.

Figure 23:
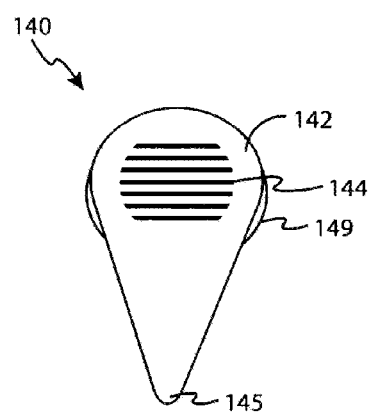
FIG. 23 is a front view of a puncture tool for use with visor assembly.
Figure 24:
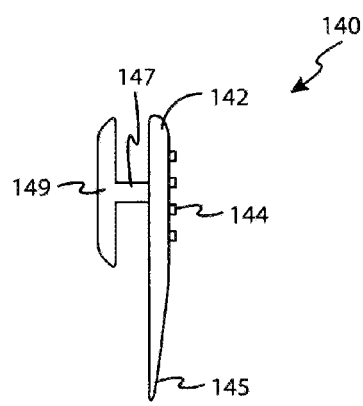
FIG. 24 is a side view of the puncture tool of FIG. 23.

FIG. 23 is a front view of a puncture tool 140 for use with visor assembly. FIG. 24 is a side view of the puncture tool 140 of FIG. 23. On the front 142 of the tool 140 can be a gripping surface that can have raised ribs or grooves thereon, and extending downward can be a narrow tip 145. The stud/rear wall 148 can be joined to the front wall by a stem portion 147. In operation, the user can grip the tool 140 by pinching the front wall 142 and rear wall 148 between two fingers, and push the narrow tip 145 into a partial cut-out opening 80 as desired to mount charm(s) 50, logo plate(s) 60 thereon. The tool 140 can also be stored on the visor assembly 1 by pushing the stud/rear wall 148 into a throughhole cut-out 80 on the visor assembly.

The invention can be distributed and/or sold in a package or kit form, having visor assembly 1, along with a plurality of logo plates 60 and decorative (charm) parts 50 and puncture tool 140, and sunglass/eyeglass adapter 170.

Although, the cut-out slots (sockets) 80, 100 for the labels 60 and charms 50 are shown to be circular, the sockets can have other geometrical shapes, such as but not limited to triangular, rectangular, hexagon, and the like. Still furthermore, the sockets can be customized into other desirable shapes such as but not limited to character outline shapes, such as Mickey Mouse, animals, mammals, birds, fish, and any other desirable outline shape, and the like.

Figure 25:
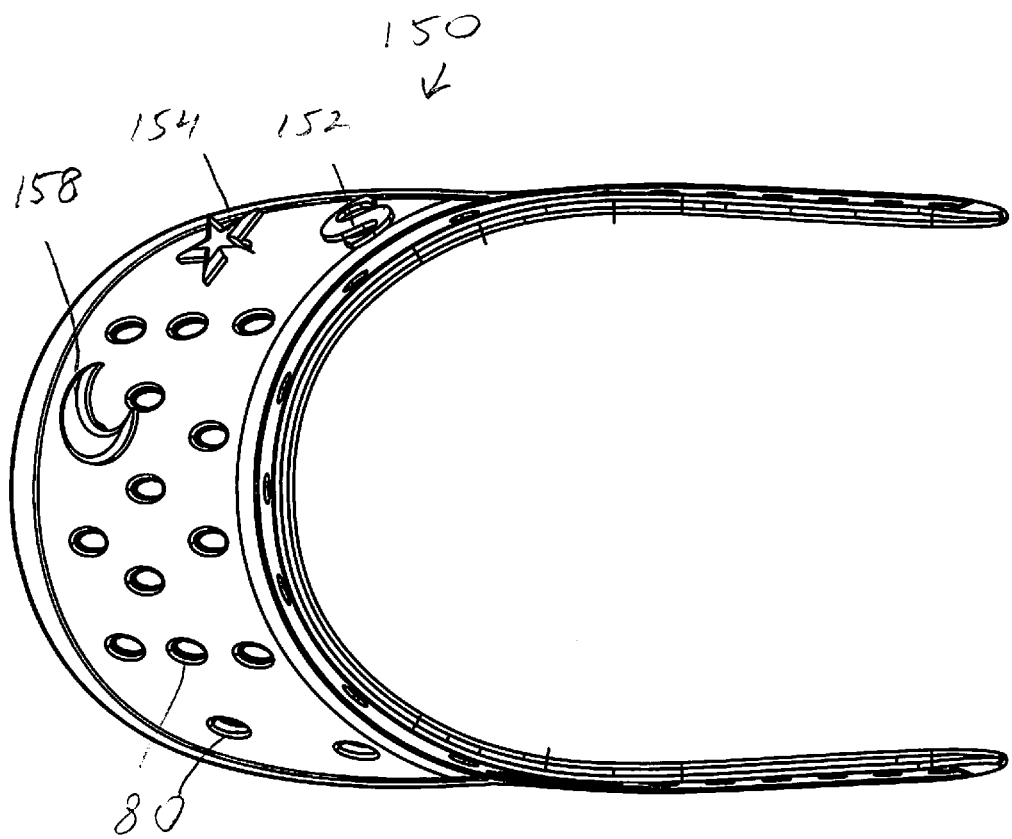
FIG. 25 is a top view of another visor assembly.
Figure 26:
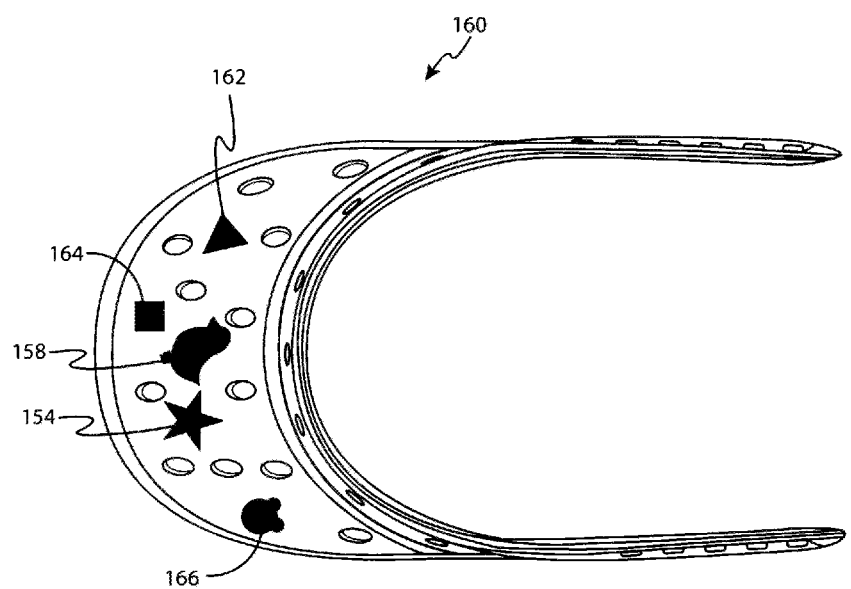
FIG. 26 is a top view of still another visor assembly.

FIG. 25 is a top view of another visor assembly 150. FIG. 26 is a top view of still another visor assembly 160. Here, different shapes, such as letter shaped cutout 152, star shaped cutout 154, half moon shaped cutout 158, triangle shaped cutout 162, rectangular/square shaped cutout 164, and other shapes 166, such as cartoon character shaped cutout 166 can be formed into the visor assembly 150, 160.

FIG. 27 is a perspective view of an adapter 170 for mounting sunglasses/eyeglasses to the visor assembly 190 (shown in FIGS. 30-32. FIG. 28 is a side view of the adapter 170 of FIG. 27. FIG. 29 is a front view of the adapter 170 of FIG. 27. The adapter 170 can include a front wall 172 having a curved hook 174 fixed thereon, with a stem 175 to attach to a stud/rear wall 178.

FIG. 30 is a front perspective view of a visor assembly 190 with adapter of FIG. 27 and mounted sunglasses/eyeglasses 180. FIG. 31 is a side view of the visor assembly 190, adapter 170 and mounted sunglasses 180 of FIG. 30. FIG. 32 is a front view of the visor assembly 190, adapter 170 and mounted sunglasses 180 of FIG. 30. The user can push the stud/rear wall 178 of the adapter 170 through headband adjustment holes 100 on both sides of the visor assembly 190 with the free end of the hook 174 angled upward. Next, the arms 182 of the eyeglasses/sunglasses 180 can be positioned into the hook portions 174, with the glass portions of the eyeglasses/sunglasses 180 positioned on the visor/brim 20. The curved hooks 174 can be angled so that the arms 182 of the eyeglasses/sunglasses 180 are tightly held in place. The user can safely store their eyeglasses/sunglasses 180 on the visor assembly 190. And when the eyeglasses/sunglasses 180 are needed, the user, can easily remove the eyeglasses/sunglasses 180 from the adapter 170 to wear them when needed.

While the invention shows plug on labels and charms, the invention can be used with other accessories. For example, a scalp cover can attach to the top of the visor assembly and have plug in base members that allow for the cover to protect the scalp of the wearer. Furthermore, a neck shade attachment formed from similar material or formed from cloth or fabric, can attach by pluggable members to the rear of the band strap. Still furthermore, other accessories, such as but not limited to sunglass shades, and the like, can also be pluggable onto the visor assembly.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:
1. A visor assembly, consisting of:
a one-piece brim and a front headband molded from a soft, flexible and pliable EVA (ethylene vinyl acetate) material, the EVA material modified to be waterproof, floatable, antibacterial, temperature tough resistant, stress crack resistant, and UV (ultra violet) radiation resistant, the front headband having a left strap end and a right strap end;

a plurality of slot shapes on both the brim and the front surface portion of the headband;

a separate removable rear headband strap having a first end for being attachable and detachable from the left strap end of the front headband, and a second end for being attachable and detachable from the right strap end of the front headband, the separate rear head band being molded from the soft, flexible and pliable EVA (ethylene vinyl acetate) material, the EVA material modified to be waterproof, floatable, antibacterial, temperature tough resistant, stress crack resistant, and UV (ultra violet) radiation resistant; and at least one accessory having a male member that mateably attaches into at least one of the slots, wherein the accessory is both attachable and detachable from the brim and the front headband.

2. The visor assembly of claim 1, wherein the removable rear head band strap includes:
rivet members having inwardly protruding portions for being insertable into a plurality of adjustment holes in the removable rear headband strap.

3. The visor assembly of claim 1, wherein the accessory includes:
a logo plate, having indicia across a front surface of the logo plate.

4. The visor assembly of claim 1, wherein the accessory includes:
a decorative charm.

5. The visor assembly of claim 1, wherein the accessory includes:
both a logo plate and a decorative charm.

6. The visor assembly of claim 1, wherein the slot shapes include circular shapes.

7. The visor assembly of claim 1, wherein the slot shapes include noncircular geometrical shapes.

8. The visor assembly of claim 1, wherein the slot shapes include outline shapes of different characters and objects.

9. The visor assembly of claim 1, wherein the slot shapes include through-hole cutouts through the brim and front headband.

10. The visor assembly of claim 1, wherein the slot shapes include partial cutouts through only a surface portion of the brim.

11. The visor assembly of claim 10, further comprising:
a puncture tool for puncturing a partial-cutout into a through-hole cutout.

12. The visor assembly of claim 1, further comprising:
an adapter for attaching sunglasses/eyeglasses to the visor assembly.

13. A visor assembly, comprising:
a one-piece brim and front headband formed from a soft, flexible and pliable EVA (ethylene vinyl acetate) material, the EVA material modified to be waterproof, floatable, antibacterial, temperature tough resistant, stress crack resistant, and UV (ultra violet) radiation resistant;

a plurality of both through-hole slots and partial cut-out slots along a front surface portion of the brim, and through-hole slots in the front headband;

a removable rear headband strap having ends that are attachable by fasteners to left and right portions of the front headband, the removable rear headband strap being formed from the soft, flexible and pliable EVA (ethylene vinyl acetate) material the EVA material modified to be waterproof, floatable, antibacterial, temperature tough resistant, stress crack resistant, and UV (ultra violet) radiation resistant; and a plurality of accessories, each accessory having a male member that mateably attaches into at least one of the through-hole slots and partial cut-out slots, wherein the accessories are both attachable and detachable from the brim with headband, and wherein the accessories are selected from logo plates and decorative charms.

14. The visor assembly of claim 13, wherein the fasteners for the removable rear headband strap includes:
rivet members having inwardly protruding portions for being insertable into a plurality of adjustment holes in the removable rear headband strap.

15. The visor assembly of claim 14, wherein the accessories further include:
a puncture tool for punching out the partial cutout slots, and an adapter for mounting sunglasses/eyeglasses to the visor assembly.

16. A visor assembly kit, consisting in combination of:
a one-piece brim and headband molded from a soft, flexible and pliable plastic EVA (ethylene vinyl acetate) material, the EVA material modified to be waterproof, floatable, antibacterial, temperature tough resistant, stress crack resistant, and UV (ultra violet) radiation resistant;

a rear headband having ends attachable and detachable to sides of the front headband, the rear headband molded from the soft, flexible and pliable plastic EVA material, the EVA material modified to be waterproof, floatable, antibacterial, temperature tough resistant, stress crack resistant, and UV (ultra violet) radiation resistant a plurality of both through-hole slots and partial cut-out slots along a front surface portion of the brim and through-hole slots in the front headband visor with headband; and a plurality of accessories, each accessory having a male member that mateably attaches into at least one of the through-hole slots and partial cut-out slots, wherein the accessories are both attachable and detachable from the visor with the brim and the front headband, and wherein the accessories are selected from the group consisting of logo plates and decorative charms and a puncture tool to punch out a partial cutout for allowing the logo plates or decorative charms to be mounted in the one-piece brim with front headband, and an adapter for mounting sunglasses/eyeglasses to the visor assembly.

17. The visor assembly kit of claim 16, wherein the plurality of both through-hole slots and partial cut-out slots, include different shapes.

* * * * *